United States Patent
Iorio et al.

(10) Patent No.: US 7,989,095 B2
(45) Date of Patent: Aug. 2, 2011

(54) MAGNETIC LAYER WITH NANODISPERSOIDS HAVING A BIMODAL DISTRIBUTION

(75) Inventors: Luana Emiliana Iorio, Clifton Park, NY (US); Pazhayannur Ramanathan Subramanian, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 631 days.

(21) Appl. No.: 11/023,736

(22) Filed: Dec. 28, 2004

(65) Prior Publication Data

US 2006/0141139 A1 Jun. 29, 2006

(51) Int. Cl.
*G11B 5/66* (2006.01)
(52) U.S. Cl. .................................... 428/827
(58) Field of Classification Search .............. 428/827, 428/828, 828.1, 839.1, 839.2, 839.6
See application file for complete search history.

(56) References Cited

U.S. PATENT DOCUMENTS

| | | | | |
|---|---|---|---|---|
| 3,715,793 | A * | 2/1973 | Kefalas et al. | 428/601 |
| 4,608,297 | A * | 8/1986 | Shimada et al. | 428/811.3 |
| 4,687,712 | A * | 8/1987 | Sugita et al. | 428/611 |
| 5,098,773 | A * | 3/1992 | Saito et al. | 428/212 |
| 5,158,933 | A * | 10/1992 | Holtz et al. | 204/192.15 |
| 5,328,523 | A * | 7/1994 | Fontaine et al. | 148/108 |
| 5,403,457 | A | 4/1995 | Nago et al. | |
| 5,452,167 | A | 9/1995 | Nago | |
| 5,837,392 | A * | 11/1998 | Katori et al. | 428/812 |
| 6,014,317 | A * | 1/2000 | Sylvester | 361/760 |
| 6,063,512 | A * | 5/2000 | Osaka et al. | 428/812 |
| 6,099,698 | A * | 8/2000 | Hatakeyama et al. | 204/192.15 |
| 6,137,389 | A * | 10/2000 | Uchikoba | 336/83 |
| 6,630,255 | B1 | 10/2003 | Litvinov et al. | |
| 6,641,935 | B1 * | 11/2003 | Li et al. | 428/828.1 |
| 6,753,072 | B1 * | 6/2004 | Chen et al. | 428/828 |
| 6,858,330 | B2 * | 2/2005 | Tanahashi et al. | 428/827 |
| 7,060,374 | B2 * | 6/2006 | Kobayashi et al. | 428/828 |
| 2002/0187368 | A1 * | 12/2002 | Senzaki et al. | 428/694 T |
| 2004/0009375 | A1 * | 1/2004 | Tanahashi et al. | 428/695 |
| 2004/0151949 | A1 | 8/2004 | Oikawa et al. | |
| 2004/0209098 | A1 * | 10/2004 | Kobayashi et al. | 428/493 |
| 2004/0219328 | A1 * | 11/2004 | Tasaki et al. | 428/65.3 |
| 2005/0112389 | A1 * | 5/2005 | Loureiro et al. | 428/472 |

FOREIGN PATENT DOCUMENTS

| | | |
|---|---|---|
| EP | 1372140 | 12/2003 |
| EP | 1426982 | 6/2004 |
| JP | 6124846 A | 5/1994 |
| JP | 6338410 A | 12/1994 |
| JP | 10340424 A | 12/1998 |
| JP | 2000054083 A | 2/2000 |

OTHER PUBLICATIONS

C. R. Sullivan, S. R. Sanders, "Microfabrication process for high-frequency power-conversion transformers", in IEEE Electronics Spec. Conf., 1995, p. 658-64 vol. 2.

C. R. Sullivan, S. R. Snaders, "Microfarication of transformers and inductors for high frequency power conversion", in IEEE Power Electronics Spec. Conf., 1993, pp. 33-41.

Search Report—Apr. 20, 2006.

* cited by examiner

*Primary Examiner* — Mark Ruthkosky
*Assistant Examiner* — Gary Harris
(74) *Attorney, Agent, or Firm* — Paul J. DiConza

(57) ABSTRACT

An article comprising a multilayered structure comprising a series of magnetic layers is provided. The magnetic layers comprise a magnetic material, and an insulating layer is disposed between successive magnetic layers. Each magnetic layer has a thickness of at least about 2 micrometers and magnetic material has an average grain size less than 200 nm. Also provided is a method for making the article.

24 Claims, 1 Drawing Sheet

# MAGNETIC LAYER WITH NANODISPERSOIDS HAVING A BIMODAL DISTRIBUTION

BACKGROUND OF THE INVENTION

The invention is related to a laminated structure of a magnetic material. More particularly, the invention is related to a laminated structure comprising a soft magnetic material. The invention is also related to a method for making a magnetic laminated structure.

Soft magnetic materials play a key role in a number of applications, especially in electric power applications, data storage, microwave communication, and transducers. They are also an integral part of electric motors, which require magnetic materials having properties such as, for example, high saturation magnetization, high permeability, low hysteresis loss and low eddy current losses. Generally, achieving high strength and superior magnetic performance concurrently is difficult, because high strength typically is obtained at the expense of magnetic properties such as saturation and core loss. Therefore there is a need for magnetic materials with superior magnetic properties and high strength.

Moreover, methods such as rapid solidification that are currently used to make materials which are magnetically soft and have high yield strengths are restricted to thin films of the order of about 15 to 50 micrometers in thickness. An additional disadvantage of the rapidly solidified materials is their relatively low saturation magnetization. Therefore, what is needed is a soft magnetic material with superior magnetic properties and high mechanical strength and a method of producing these materials.

BRIEF DESCRIPTION OF THE INVENTION

The present invention meets these and other needs.

One aspect of the invention is an article comprising a multilayered structure comprising a series of magnetic layers. The magnetic layers comprise a magnetic material, and the insulating layer is disposed between successive magnetic layers. Each magnetic layer has a thickness of at least about 2 micrometers, and the magnetic material has an average grain size not more than about 200 nanometers.

A second aspect of the invention is a method for making an article. The method comprises the steps of providing a substrate; depositing a series of magnetic layers on said substrate, said magnetic layers comprising a magnetic material, wherein the magnetic material has an average grain size not more than 200 nanometers; and disposing an electrically insulating layer between successive magnetic layers.

DESCRIPTION OF THE DRAWINGS

These and other features, aspects, and advantages of the present invention will become better understood when the following detailed description is read with reference to the accompanying drawing in which like characters represent like parts throughout the drawing, wherein.

DETAILED DESCRIPTION OF THE INVENTION

Figure 1:
FIG. 1 is a perspective view of a laminated magnetic structure 100, in accordance with one particular embodiment of the invention.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

Soft magnetic materials are typically used as cores in electronic and electrical circuits because their ability to be easily demagnetized allows magnetic energy to be converted easily back into electrical energy and reintroduced to the electrical circuit.

Core loss, an important parameter in soft magnetic materials, is the sum of hysteresis loss and eddy current loss. Because core loss represents inefficiency, it is generally sought to be minimized in component designs. Hysteresis loss results from the fact that not all energy required to magnetize a material is recoverable when it is demagnetized. Eddy current loss is the result of circulating currents that are induced when the flux density changes in the magnetic material. The amplitude of these currents is dependent on frequency of the applied field and the electrical resistivity of the material. Soft ferrites have very high resistivities and hence low eddy current losses. This is the reason they are the material of choice for high-frequency applications. Soft ferrites, however, typically have relatively low saturation magnetization hence limiting the flux density.

For many applications, magnetic materials with high permeability, high saturation magnetization, low core loss and high mechanical strength are preferred. Therefore, there is a continuing need for magnetic materials with improved magnetic properties and mechanical strength.

The article of the present invention comprises a multilayered structure comprising a series of magnetic layers, the magnetic layers comprising a magnetic material, wherein an insulating layer is disposed between successive magnetic layers. Each magnetic layer has a thickness of at least about 2 micrometers and, the magnetic material has an average grain size not more than about 200 nanometers.

Reference will now be made to the drawing to describe the invention in detail. FIG. 1 is a perspective view of a laminated magnetic structure 100, in accordance with one embodiment of the invention. It comprises a series of layers comprising a magnetic material, herein referred to as "magnetic layers" 110, with an insulating layer 120 disposed between successive magnetic layers 110. In some embodiments, the magnetic layers 110 comprise a soft magnetic material.

In a particular embodiment, the magnetic material comprises a soft magnetic alloy comprising iron (Fe) and cobalt (Co). In some embodiments, Co is present in the alloy in the range from about 15 atomic percent to about 50 atomic percent. The Fe—Co alloys desirably exhibit high saturation magnetization $B_s$ (greater than 2 Tesla) and high Curie temperatures $T_c$ ($Tc \approx 900°$ C.)

In another embodiment, the Fe—Co soft magnetic material further comprises an (meaning at least one) additive generally selected from the group consisting of vanadium, niobium, zirconium, hafnium, chromium, nickel, molybdenum, tungsten, aluminum, and combinations thereof. These additives may be included, for instance, to improve the corrosion resistance, to enhance the resistivity, to enhance the strength, or to adjust the magnetic properties. Specific combinations of additives are chosen based on the particular requirements of specific applications. In particular embodiments, the additive is present in an amount of up to about 5 atomic percent.

In yet another embodiment, the soft magnetic material comprises Fe, Co, and V, and in particular embodiments the Co is present in an amount of up to about 49 atomic percent and V is present in an amount of up to about 2 atomic percent. The vanadium addition increases the resistivity and workability of the alloy.

The bulk resistivity and hence the eddy current loss of the magnetic structure can be controlled by the insertion of an insulating layer. In one embodiment, the insulating layer has a thickness of less than about 25 micrometers. In particular embodiments, the insulating layer has a thickness in the range of about 10 nanometers to about 5 micrometers. In some embodiments, the insulating layer comprises a ceramic, such as, for example, an oxide. Some non-limiting examples of oxides that may be used as insulating layers include magnesium oxide, rare-earth oxides such as cerium oxide, europium oxide, and yttrium oxide, silicon dioxide, aluminum oxide, bismuth manganite, and yttrium aluminates, yttrium titanate, cuprates, silicates and magnesium aluminate.

The desired thickness of the magnetic layer is in part dependent on the frequency of operation; higher frequencies drive the need for lower thicknesses. On the other hand, lower thicknesses of the magnetic layers increase the manufacturing complexity of the material. Moreover, in applications requiring a high flux density, the stacking factor, which is the ratio of the thickness of magnetic layers to the total thickness (magnetic layer thickness+insulation layer thickness), is a further design consideration. High stacking factors enable operation at higher flux densities. Typically the stacking factor is maintained greater than 0.99 in embodiments of the present invention. Thus the selected thickness may represent a tradeoff among competing design considerations. In one embodiment, the magnetic layer has a thickness in the range from about 5 micrometers to about 350 micrometers. In particular embodiments, the magnetic layer has a thickness in the range from about 15 micrometers to about 200 micrometers.

The grain size of the material in the magnetic layer affects a combination of magnetic properties and mechanical properties. Grain sizes on a nanometer scale are expected to reduce the coercivity of the material and hence to lower the hysteresis losses while increasing the material permeability. Accordingly, in one embodiment, the magnetic material has an average grain size not more than about 200 nm. In certain embodiments, the magnetic material has an average grain size not more than about 100 nm, and in particular embodiments the average grain size is in a range from about 10 nm to about 50 nm.

One method for achieving enhanced magnetic properties is to introduce a dispersion of very fine particulates, also referred to as "dispersoids", into the microstructure of the magnetic material. The dispersoids are added to pin the grain boundaries within the material, thereby maintaining the mechanical and magnetic properties achieved through grain refinement. Introduction of dispersoids having individual particulate size on the nanometer scale, referred to as "nanodispersoids," could therefore provide for the manufacture of material having thermally stable nano-sized grains, which, in addition to enhancing the mechanical strength of the magnetic material, could also prevent the degradation of magnetic properties during service. In one embodiment, the magnetic material further comprises a plurality of nanodispersoids present in the range from about 0.2 volume percent to about 10 volume percent. In one embodiment, the nanodispersoids comprise a ceramic. The ceramic may comprise, among other materials, any of an oxide, a carbide, a nitride, a silicide, a silicate, a carbo-nitride, an oxynitride, and combinations thereof. Some non-limiting examples of oxides that may be used as dispersoids include magnesium oxide; rare-earth oxides such as cerium oxide, europium oxide, and yttrium oxide; aluminum oxide; silicon dioxide; bismuth manganite; yttrium aluminate; yttrium titanate; cuprates; silicates; and magnesium aluminate. Moreover, the particular nanodispersoid composition may be selected to have specific properties, such as magnetic properties, that can be used to tailor the overall properties of the magnetic layer. In some embodiments, irrespective of nanodispersoid material type that is selected, the nanodispersoid comprises a ferromagnetic phase, a ferrimagnetic phase, or a paramagnetic phase.

In a particular embodiment, the plurality of nanodispersoids has an average particle size not more than 100 nm. In another embodiment, the plurality of nanodispersoids has an average particle size in the range of about 5 nm to about 50 nm. In yet another embodiment, the plurality of nanodispersoids has an average particle size in the range of about 5 nm to about 25 nm. These nano dispersoids need not necessarily be spherical in shape. When particles are substantially spherical, a particle size is generally taken to be the diameter of the particle. When the particles are non-spherical the "effective" particle size is characterized in the art by the diameter of a theoretical sphere of equivalent volume to that of the actual non-spherical particle. It will be understood that the term "average particle size" as used herein refers to this "effective" particle size where particles are non-spherical, as well as to the actual particle diameter where the particles are spherical.

In some embodiments, the plurality of nano dispersoids may be desirable to have a bimodal size distribution, as a bimodal distribution is more effective in pinning grains via the Zener mechanism. In a particular embodiment, the bimodal size distribution has a first mode in the range from about 5 nm to about 25 nm and a second mode in the range from about 40 nm to about 70 nm.

A method for making the structure described above comprises the steps of providing a substrate and depositing a series of magnetic layers on the substrate, where the magnetic layers comprise a magnetic material; and disposing an insulating layer between successive magnetic layers. The layers can be of any thickness, including the thickness ranges specified in the structure embodiments described above. In some embodiments the thickness of the magnetic layer is at least about 2 micrometers. Any deposition method known in the art may be used for preparing laminated structures. In some embodiment, the deposition technique is physical vapor deposition. In one embodiment, the technique is electron beam physical vapor deposition (EB-PVD) and in another embodiment, the technique is ion-beam enhanced deposition. In one embodiment, electron beam physical vapor deposition (EB-PVD) is used to deposit alternating layers of a soft magnetic material and an insulating material, in accordance with the thickness considerations set forth above in the description of the structure itself. In this technique, the soft magnetic material and the insulating material to be deposited are fabricated as ingots, which are then used as targets in an EB-PVD process. The targets are evaporated under pre-defined conditions using high-power electron beams, and the evaporants are allowed to condense on a stationary or rotating substrate maintained at a pre-determined temperature. The alternating layers of magnetic material and insulator are produced by evaporating only one target at a given time. Alternatively, the different layers can be produced by rotating the substrate above the two different targets. The individual layer thicknesses are controlled by varying the evaporation rate and time of deposition of each material. EB-PVD offers the advantages of precise control over the deposition rate during high rate deposition, excellent material utilization, sequential and co-deposition, high evaporation rates, and precise film composition.

The structure of the present invention is designed to meet fundamentally different design requirements from those applied to conventional thin-film laminated magnetic devices, such as magnetic recording or storage devices. In devices comprising laminated-structures such as those mentioned above, it is advantageous to use very thin magnetic films from the stand point of minimizing the demagnetizing field in the devices, maintaining low switching fields, and reducing switching currents. Such thin-film structures are generally limited to maximum layer thicknesses on the order of about 1 micrometer, making feasible the use of slower deposition processes such as magnetron sputtering. Although sputtering may be used to achieve layers as thick as required for the structure of the present invention, EB-PVD is a considerably more practical alternative due to its much higher rate of deposition and rate of material utilization.

EB-PVD offers a further advantage of tailoring the individual layer structure through process modifications. For example, the soft-magnetic layer can be produced as a particulate-reinforced structure using a third target that is co-evaporated along with the magnetic material to produce a dispersion—reinforced structure. In one embodiment, the deposition comprises co-depositing nano dispersoids with the magnetic material. The nano-dispersoids have the same compositional, morphological, and size characteristics as described above for the article embodiments. During co-deposition, the rate of deposition for the nano dispersoids is controlled in some embodiments to provide a volume fraction of nano dispersoids in the range of about 0.2 volume percent to about 10 volume percent.

The grain size of the magnetic material may be controlled in part by controlling the rate of deposition. A high rate of deposition is preferred to obtain multiple nucleation sites, which in turn enables the formation of nano-sized grains. In one embodiment, the deposition is carried out at a rate of at least 2-micrometers/minute. In another embodiment, the deposition is carried out at a rate ranging from about 2 to about 10 micrometers/minute. In certain embodiments, the deposition technique used includes EB-PVD, as it provides a high rate of deposition. On the other hand, physical vapor deposition techniques such as magnetron sputtering or ion-plating are inherently very slow processes. EB-PVD has an order-of-magnitude higher rates and thus suited for the fabrication of the thick multilayer structures proposed here for the various applications.

The temperature of the substrate also affects the grain size and the microstructure. The temperature is optimized for obtaining a dense magnetic layer with nano-sized grains. Low substrate temperatures lead to porous films, and high substrate temperatures lead to grain growth. Therefore, it is essential to choose an appropriate substrate temperature in order to obtain dense nano-grained films. In one embodiment, the substrate is kept at a temperature not more than 600° C. In another embodiment, the substrate is kept at a temperature ranging from about 400° C. to about 500° C.

The article of the present invention may have a wide variety of applications. For example, it may be used as a core material of various magnetic devices. It is possible to realize devices such as power transformers, pulse transformers, filters, choke coils, and inductors utilizing these laminated structures. Embodiments of the present invention encompass any such devices that incorporate the laminated structure presented herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article comprising:
a multilayered structure comprising a series of magnetic layers, said magnetic layers comprising a magnetic material, wherein an insulating layer is disposed between successive magnetic layers, such that said structure comprises at least a first magnetic layer, an insulating layer disposed on the first magnetic layer, and a second magnetic layer disposed on the insulating layer, wherein each magnetic layer has a thickness of at least about 2 micrometers, each insulating layer has a thickness in the range of about 10 nanometers to about 5 micrometers, and wherein said magnetic material comprises a crystalline material having an average grain size not more than about 200 nm; comprises Co in the range from about 15 atomic percent to about 50 atomic percent; and comprises a plurality of nanodispersoids comprising a ceramic, wherein said plurality of nanodispersoids has a bimodal size distribution.

2. The article according to claim 1, wherein said magnetic material comprises a soft magnetic material.

3. The article according to claim 2, wherein said soft magnetic material has a saturation magnetization of at least 2 Tesla.

4. The article according to claim 1, wherein said magnetic material further comprises Fe.

5. The article according to claim 4, wherein said magnetic material further comprises an additive selected from the group consisting of V, Nb, Zr, Hf, Cr, Ni, Mo, W, Al, and combinations thereof.

6. The article according to claim 4, wherein said additive is present in an amount of up to about 5 atomic percent.

7. The article according to claim 1, wherein said magnetic material comprises Fe, Co, and V.

8. The article according to claim 7, wherein said magnetic material comprises Co in an amount of up to about 49 atomic percent and V in an amount of up to about 2 atomic percent.

9. The article according to claim 1, wherein said magnetic material has an average grain size not more than 100 nm.

10. The article according to claim 1, wherein said magnetic material has an average grain size in a range from about 10 nm to about 50 nm.

11. The article according to claim 1, wherein said magnetic layer has a thickness in the range of 5 micrometer to 350 micrometers.

12. The article according to claim 1, wherein said magnetic layer has a thickness in the range of about 15 micrometers to about 200 micrometers.

13. The article according to claim 1, wherein said nanodispersoids are present in the range of about 0.2 volume percent to about 10 volume percent.

14. The article according to claim 1, wherein said ceramic comprises at least one selected from the group consisting of an oxide, a carbide, a nitride, a silicide, a silicate, a carbonitride, an oxynitride and combinations thereof.

15. The article according to claim 14, wherein said oxide comprises an yttrium oxide.

16. The article according to claim 15, wherein said yttrium oxide comprises $Y_2O_3$.

17. The article according to claim 1, wherein said plurality of nanodispersoids have an average particle size not more than 100 nm.

18. The article according to claim 17, wherein said plurality of nanodispersoids have an average particle size in the range of about 5 nm to about 50 nm.

19. The article according to claim 18, wherein said plurality of nanodispersoids has an average particle size in the range of about 5 nm to about 25 nm.

20. The article according to claim 1, wherein said bimodal size distribution has a first mode in the range from about 5 nm to about 25 nm and a second mode in the range from about 40 nm to about 70 nm.

21. The article according to claim 1, wherein said insulating layer comprises a ceramic.

22. The article according to claim 21, wherein said ceramic comprises an oxide.

23. The article according to claim 22, wherein said oxide comprises at least one oxide selected from the group consisting of magnesium oxide, a rare-earth oxide, cerium oxide, europium oxide, yttrium oxide, silicon dioxide, aluminum oxide, bismuth manganite, yttrium aluminates, yttrium titanate, cuprates, silicates, and magnesium aluminate.

24. An article comprising:
   a multilayered structure comprising a series of magnetic layers and insulating layers, wherein
      each insulating layer has a thickness in the range from about 10 nanometers to about 5 micrometers; comprise an oxide; and is disposed between successive magnetic layers, and
      each magnetic layer has a thickness in the range from about 5 micrometer to 350 micrometers; and comprise a crystalline soft magnetic material, wherein said soft magnetic material comprises Fe; Co in the range from about 15 atomic percent to about 50 atomic percent; a crystalline material having an average grain size less than about 100 nm; and a plurality of nanodispersoids comprising a ceramic and having a bimodal size distribution.

* * * * *